US011388250B1

(12) United States Patent
Barak et al.

(10) Patent No.: US 11,388,250 B1
(45) Date of Patent: Jul. 12, 2022

(54) REDUCTION OF DATA TRANSMISSIONS BASED ON END-USER CONTENT

(71) Applicant: Proofpoint, Inc., Sunnyvale, CA (US)

(72) Inventors: Nir Barak, Karmei Yosef (IL); Alex Kremer, Lexington, MA (US); Tamir Pivnik, Nahariya (IL); Yigal Meshulam, Modiin (IL); Igal Weinstein, Ottawa (CA); Efim Kulmov, Maale Adumim (IL)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 17/137,616

(22) Filed: Dec. 30, 2020

(51) Int. Cl.
*H04L 67/568* (2022.01)
*H04L 67/50* (2022.01)
*H04L 9/06* (2006.01)
*H04L 67/01* (2022.01)
*H04L 67/306* (2022.01)

(52) U.S. Cl.
CPC ........ *H04L 67/2842* (2013.01); *H04L 9/0643* (2013.01); *H04L 67/22* (2013.01); *H04L 67/306* (2013.01); *H04L 67/42* (2013.01)

(58) Field of Classification Search
CPC ... H04L 67/2842; H04L 6/306; H04L 9/0643; H04L 67/22; H04L 67/42
See application file for complete search history.

(56) References Cited

U.S. PATENT DOCUMENTS

| | | | |
|---|---|---|---|
| 2012/0095979 A1* | 4/2012 | Aftab | H04W 4/023 707/E17.084 |
| 2016/0239534 A1* | 8/2016 | Evans | G06F 9/445 |
| 2017/0359306 A1* | 12/2017 | Thomas | H04L 63/145 |
| 2018/0191766 A1* | 7/2018 | Holeman | H04L 63/1416 |
| 2021/0084063 A1* | 3/2021 | Triantafillos | H04L 67/22 |

* cited by examiner

*Primary Examiner* — Nicholas R Taylor
*Assistant Examiner* — Tania M Pena-Santana
(74) *Attorney, Agent, or Firm* — Sheehan Phinney Bass & Green PA

(57) ABSTRACT

A computer-based method of reducing or limiting data transmissions from a computer to a remote network destination includes receiving an indication, at an agent on a computer, that a recent user activity has occurred at the computer. The indication typically includes data relevant to user context when the user activity occurred. The method further includes determining, with the agent, whether the data relevant to the user's context when the user activity occurred indicates that a change in user context relative to a user activity at the computer immediately prior to the recent user activity and conditioning a transmission of data relevant to the recent user activity from the computer to a remote network destination based on an outcome of the determination.

17 Claims, 7 Drawing Sheets

REDUCTION OF DATA TRANSMISSIONS BASED ON END-USER CONTENT

FIELD OF THE INVENTION

This disclosure relates to the field of reducing data transmissions, more particularly, relates to reducing data transmissions based on end-user context (e.g., at a network endpoint device).

BACKGROUND

Various computer-based systems exist that collect large amounts of data from multiple network-connected devices (e.g., network endpoint devices), with the collected data being transmitted across a network to some central location (e.g., a server) to be stored and/or analyzed. One example of this kind of system is an insider threat management system, such as the ObserveIT ITM (insider threat management) system, available from Proofpoint, Inc., the applicant of this patent application. In general terms, an insider threat occurs when someone with authorized access to critical information or systems misuses that access—either purposefully or accidentally—resulting in data loss, legal liability, financial consequences, reputational damage, and/or other forms of harm to the person's employer. Insider threats are on the rise and incidents thereof can be extremely costly, both in terms of reputation and finances, to the employer. The cost and complexity of operating an effective ITM system (or other system where potentially large amounts of collected may be transmitted a network to some centralized storage or processing facility) can be high due, for example, to the infrastructure and functional demands associated with transmitting, storing and processing large amounts of data.

SUMMARY OF THE INVENTION

In one aspect, a computer-based method includes receiving an indication, at an agent on a computer, that a recent user activity has occurred at the computer. The indication typically includes data relevant to user context when the user activity occurred. The method further includes determining, with the agent, whether the data relevant to the user's context when the user activity occurred indicates that a change in user context relative to a user activity at the computer immediately prior to the recent user activity and conditioning a transmission of data relevant to the recent user activity from the computer to a remote network destination based on an outcome of the determination.

In another aspect, a computer system includes a computer (with a processor and memory), a server, a communications network that enables the server and the computer to communicate with one another, and an agent on the computer. The agent typically is configured by virtue of the processor executing computer-readable instructions stored in the memory to receive an indication that a recent user activity has occurred at the computer. The indication typically includes data relevant to user's context when the user activity occurred. The agent is further configured to determine whether the data relevant to the user's context when the user activity occurred indicates a change in user context relative to a user activity at the computer immediately prior to the recent user activity; and condition a transmission of data relevant to the recent user activity from the computer to the server via the communications network based on an outcome of the determination.

In yet another aspect, a non-transitory computer-readable medium is disclosed that stores computer-readable instructions that, when executed by a processor of a computer, cause the processor to receive an indication that a recent user activity has occurred at the computer. The indication typically includes data relevant to user's context when the user activity occurred. The processor also determines whether the data relevant to the user's context when the user activity occurred indicates a change in user context relative to a user activity at the computer immediately prior to the recent user activity, and conditions a transmission of data relevant to the recent user activity from the computer to the server via the communications network based on an outcome of the determination.

In some implementations, one or more of the following advantages are present.

In the context of an insider threat management (ITM) system for example, where users' activities at endpoint devices are being monitored and tracked, the systems and techniques disclosed herein can reduce the amount of data transmitted from the endpoint devices to a central server for storage and/or processing considerably without impacting the efficacy of the ITM system in any meaningful manner. This enables the ITM system to perform in a highly effective manner without requiring large amounts of transmission bandwidth, processing capabilities, storage capabilities, etc. Moreover, these benefits can be achieved by implementing relatively simple algorithms that rely on relatively simple infrastructure, which are disclosed in detail herein. Additionally, given the relative simplicity involved, the cost associated with implementing these systems and techniques is low as well.

Moreover, certain cloud computing services, such as Amazon Web Services (AWS), provide on-demand cloud computing platforms and APIs to individuals, companies, and governments, on a metered pay-as-you-go basis. In implementations that utilize such services (e.g., as the remote processing server), implementations of the techniques and systems disclosed herein can provide significant cost savings in terms of payments due to the cloud computing service.

Additionally, in a typical implementation, the systems and techniques disclosed herein provide speed as data that is not needed may be simply dropped, which is much faster than systems that include extensive buffering and/or compression, which can take a long time to process and also can consume more resources.

Other features and advantages will be apparent from the description and drawings, and from the claims.

BRIEF DESCRIPTION OF THE DRAWINGS

Like reference characters refer to like elements.

DETAILED DESCRIPTION

Figure 1:
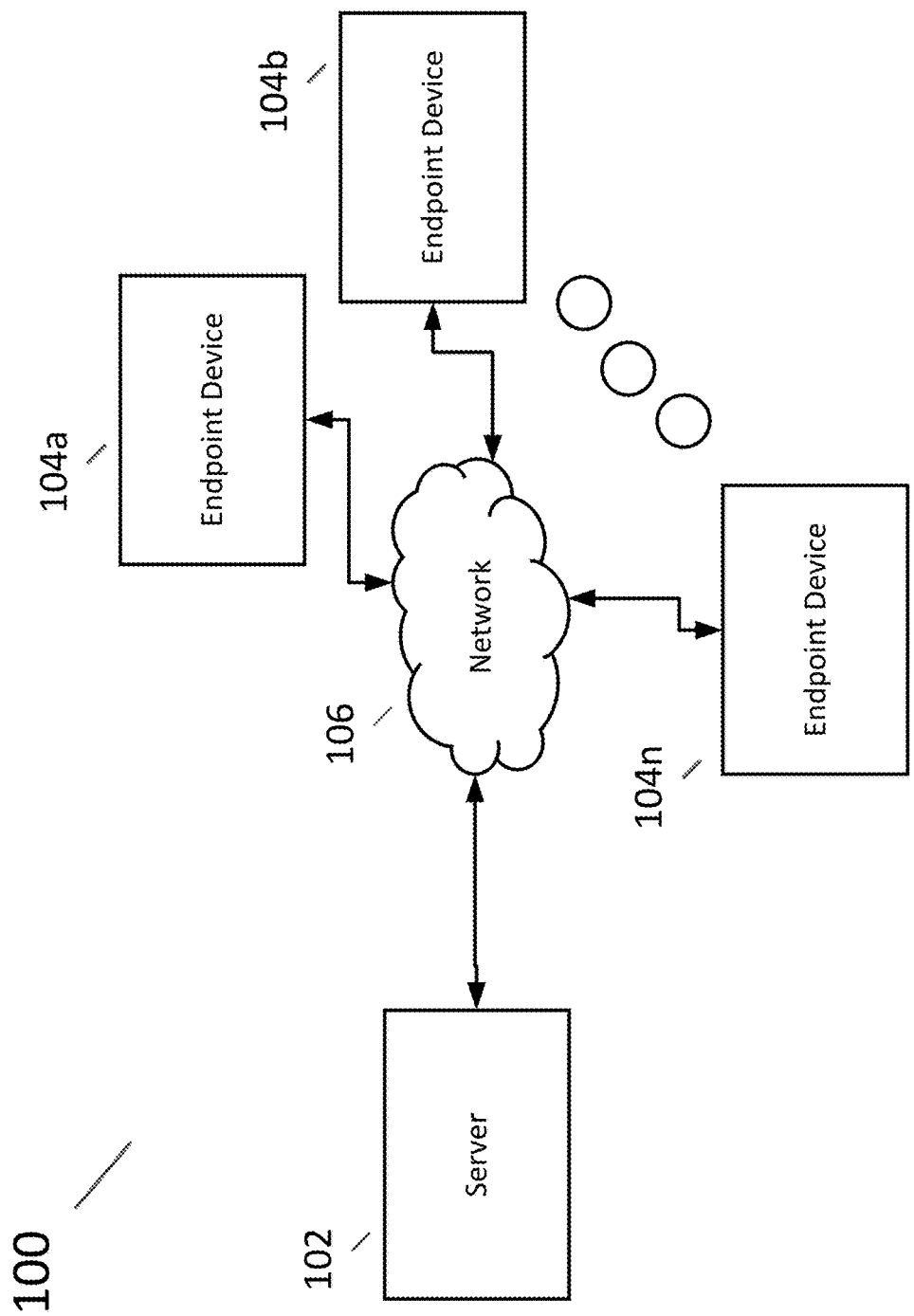
FIG. 1 is a schematic block diagram of an exemplary computer network.

FIG. 1 is a schematic block diagram of an exemplary computer network 100 that has a server 102, and a plurality of user endpoint devices 104a, 104b, . . . 104n coupled to one another via a communications network 106 that enables the server 102 and the endpoint devices 104a, 104b . . . 104n to communicate with one another.

In a typical implementation, the network 100 is configured to operate in a manner such that various data related to user activities at the various endpoint devices 104a, 104b . . . 104n is collected and transmitted to the server 102 for processing and/or storage. In some implementations, a set of user activity data is collected every time any user on the network takes any kind of action on the network. A user action may be, for example, a single mouse click or a single key press on a keyboard at any one of the network endpoint devices 104a, 104b . . . 104n. In response to a user action (also referred to as "user activity") taking place at one of the network endpoint devices, an agent on that network endpoint device collects a set of data related to the user activity. The collected data can include a wide variety of types of data but generally includes data that is relevant to the user's context at the time of the associated user activity.

In general, the phrase "user context," as used herein, refers to one, and only one, visual component (e.g., window, tab, URL, application, etc.) on the screen of the user's endpoint device that was or became active (e.g., visible to the user and able to receive input from the user) at the time of the associated user activity. Generally speaking, only one visual component on a screen can provide a user's context at any given time. The phrase "user context," as used herein, encompasses "user focus." In general, characters entered at a computer keyboard or pasted from the computer clipboard, for example, are sent to the visual component that has the user's focus at that moment. Typically, user focus is withdrawn from a particular visual component on a screen (graphical user interface) by transferring the user's focus to a different visual component on the same graphical user interface. Moving the mouse of the endpoint device will typically move the mouse pointer without changing the user focus. User focus, however, can usually be changed by clicking onto a different visual component that can receive user focus via the mouse. Some desktops also allow the focus to be changed with the keyboard, too (e.g., by utilizing certain key presses or combinations of key presses). Some other cases may allow focus change in other ways (e.g., in response to a verbal command, etc.).

In the context of an insider threat management (ITM) system, for example, the data collected by the agent on the endpoint device may include, for each user activity: a date and time stamp, a user activity category indicator (e.g., web browsing, application use, etc.) to categorize the user's activity, a user name (e.g., nirbarak) to identify the user who performed the activity, a hostname (e.g., nirs-mbp) to identify the network endpoint where the user activity occurred, a window title (e.g., "Proofpoint Insider Threat Co . . . ," "none," "Document 1," "Slack|Unread Messages 0 . . . ") to identify a title of the window where the user activity occurred, a window/tab identifier to identify a window/tab where the user activity occurred, a uniform resource locator (URL) domain (e.g., "app.oitroot.us.east-1-stage2 . . . ") to identify a URL domain where the user activity occurred, and/or an application name (e.g., Microsoft Word or Slack) to identify an application where the user activity occurred. In a typical implementation, the collected data may include a screenshot (or multiple screenshots) from the endpoint device at or near the time of the user activity. In some implementations, other data (e.g., window screen position, etc.), relevant to user context and/or insider threat risk, may be collected too.

The user activity data may be collected by the agent deployed on the endpoint device from one or more subcomponents of the endpoint device including, for example, the operating system of the endpoint device, one or more software applications on the endpoint device, and/or a file manager on the endpoint device on the endpoint device.

Every set of data collected (e.g., in response to a single user activity) could, at least potentially, be somewhat relevant to assessing the presence of an insider threat and, so, may warrant consideration in this regard. However, data processing to identify such threats typically occurs at a centralized server, for example, remotely located from endpoint devices where the data is collected and the notion of transmitting all of the data collected at the endpoint devices gives rise to possibility of serious and potentially cost prohibitive technical problems, especially if the system in question has a lot of connected endpoint devices and busy users at those endpoint devices. The technical problems can relate to available transmission bandwidth (e.g., across network 106), which can impact speed and efficiency of identifying potential insider threats, processing power (e.g., at the server 102 and/or the endpoint devices) to compress and/or process the collected data, which also can impact speed and efficiency as well as accuracy of identifying potential insider threats, and storage capacity (e.g., at the server 102 or elsewhere on the network) for storing the large amounts of data that gets transmitted to the server.

The illustrated network 100 is configured to address these technical problems by limiting the number of collected user activity data sets that get transmitted from the endpoint devices 104a, 104b . . . 104n to the server 102. The manner, in which the transmissions are limited depends on the user context associated with each collected user activity data set. More specifically, the manner in which the transmissions are limited depends, in large part, on whether there has been a change in user context from one set of user activity data collections to the next. The systems and techniques disclosed herein essentially allow transmissions to occur in response to a determination that there has been a change in user context. As a result, for each change in user context, the user activity data set collected immediately prior to the change in user context is transmitted to the server, and the user activity data set collected immediately after the change in user context is transmitted to the server. In most instances, any other user activity data sets that may be collected between user context changes are not transmitted to the server.

The inventors have observed that, in some instances, these data transmission reduction techniques may advantageously reduce the amount of collected data that is transmitted to the server 102 for processing, etc. by 70% on average without degrading the system's effectiveness at identifying potential insider threats in any meaningful way. In this regard, it is believed that transmitting a set of user activity data only at the beginning and end of each period of time that a user's context changes provides the server 102 with enough information under most, if not all, circumstances to effectively assess insider threat risk posed by the user's activities. In some implementations, however, user activity data for certain types of events that are considered of higher priority may always be transmitted, even if user context does not necessarily change. One such example may be a file transfer event. This may be done by adding this to the context which change the context on any new file event even if it is done from the same window with the same properties. To make sure such events (file copies for example) are always transmitted, in some implementations, a data property (in this case full source file path), can be added to the context, so if a user sends multiple files one after the other, each event will end up with different context. In some implementations, a simpler approach may be taken to simply check first for type and if it includes a file activity (like a file copy) the user activity data is always transmitted regardless of whether there is a context change. Those types of events, however, tend to be quite rare, more so than regular user clicks or mouse clicks hence they usually do not statistically change system operation or effectiveness significantly.

The user endpoint devices 104*a*, 104*b* . . . 104*n* in the computer network 100 may be virtually any type of computer hardware device, with software running thereupon, that a company employee might use, for example, to perform work for or on behalf of his or her employer. Some examples include computer desktop devices, smartphone devices, tablets, workstations, etc.

Figure 2:
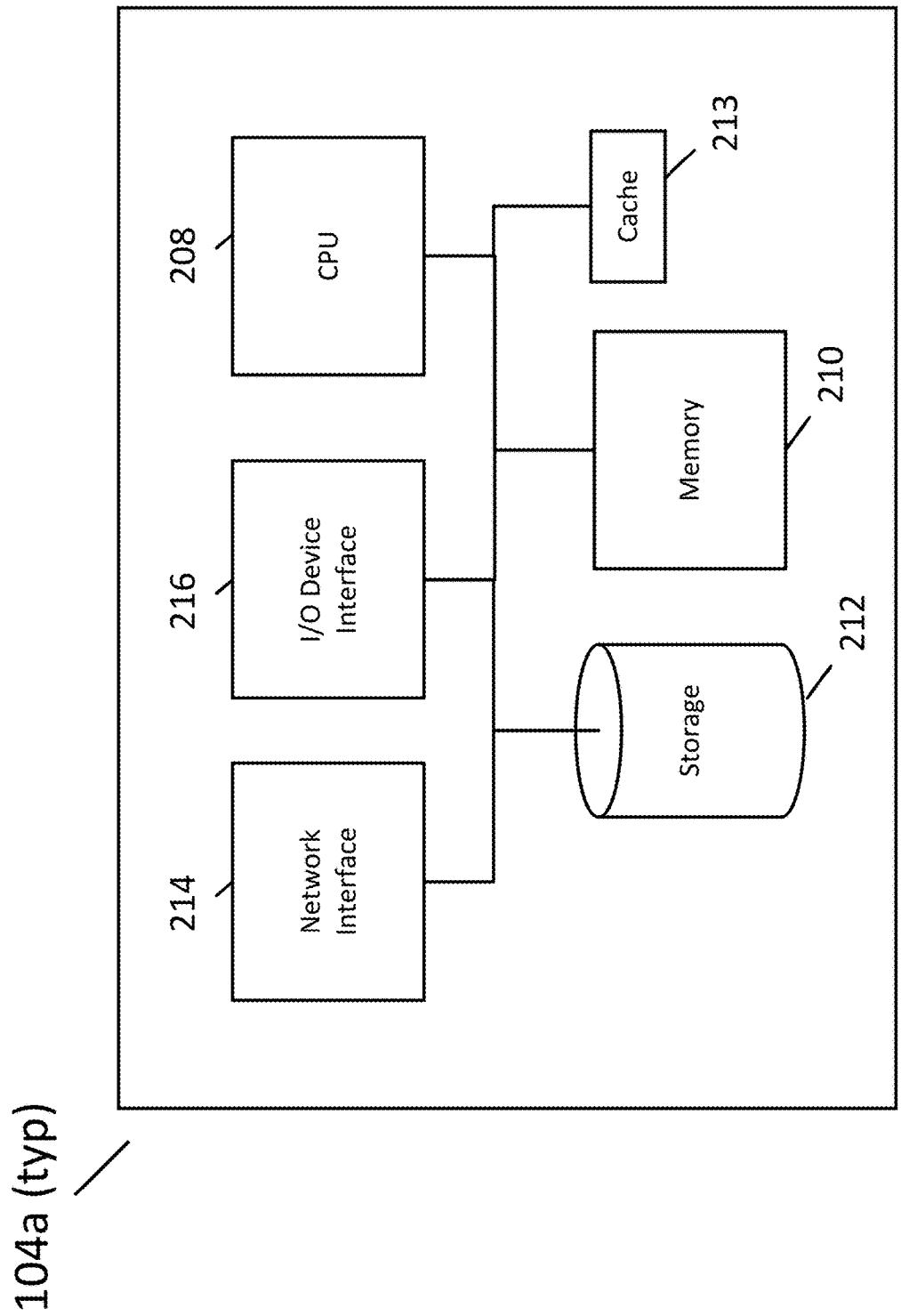
FIG. 2 is a schematic block diagram of an exemplary endpoint device in the computer network of FIG. 1.

FIG. 2 is a schematic representation showing one particular example of the user endpoint device (e.g., 104*a* in FIG. 1).

The illustrated user endpoint device 104*a* has a central processing unit (CPU) 208, computer-based memory 210, computer-based storage 212, cache memory 213, a network interface 214, an input/output device interface 216, and a bus that serves as an interconnect between these components. In a typical implementation, the bus provides a communication medium over which the various components of the computer-based user device 104*a* can communicate and interact with one another.

The central processing unit (CPU) 208 is configured to perform various computer-based functionalities, including those processing functionalities associated with any of the network 100 components disclosed herein. In the context of an ITM system, for example, the CPU 208 might, inter alia, collect metadata about user activities that happen at the associated user device 104*a* and transmit at least some portion of the collected data, via network interface 214, to a remote server (e.g., 102 in FIG. 1) for processing. Typically, the CPU performs whatever functions it performs by executing computer-readable instructions from a non-transient computer-readable medium (e.g., computer-based memory 210 and/or computer-based storage 212) or from computer-readable data received from an external source (e.g., a human user or another network device) via the I/O device interface 216 and/or the network interface 214, for example.

The computer-based memory 210 in the illustrated implementation includes one or more hardware components that provide a form of volatile storage for computer-readable instructions that, when executed by the CPU 208, cause the CPU 208 to perform various computer-based functionalities including, for example, those disclosed herein, such as collecting, processing, and/or transmitting of data.

The computer-based storage 212 includes one or more hardware components that provide a form of non-volatile storage for computer-readable instructions that, when executed by the CPU 208, cause the CPU 208 to perform various computer-based functionalities, such as those associated with a computer-based operating system (not represented in the figure) as well as potentially one or more of the other functionalities disclosed herein.

The cache memory is a 213 is a type of memory that acts as a buffer (e.g., a region of physical memory storage used to temporarily store data).

The network interface 214 in the illustrated implementation includes one or more hardware components that facilitate connecting the user device 104*a* to any one or more of a variety of different computer-based or communications networks, including, for example, local area networks (LANs), and/or wide area networks (WANs) such as the Internet. Of course, the user device 104*a* may be connected in this manner, and via the associated network, to other network devices (e.g., the server 102 in network 100 and/or the other user devices (e.g., 104*b* . . . 104*n*).

The input/output device interface 216 in the illustrated implementation includes one or more hardware components configured to act as a connection interface for one or more input and/or output devices such as a keyboard, mouse, display, audio speaker, microphone, etc. In a typical implementation, the user device 210*a* may configured so as to display (e.g., on a display device (not shown) connected to the I/O device interface 216) user interfaces associated with any software application, for example, that a user might interact with from the user device 210*a*. Such applications might include, for example, web browsers, word processors, email programs, media players, computer-aided design programs, etc.

The schematic representation of endpoint device 210*a* can vary considerably from the illustrated configuration. For example, in various implementations, the user endpoint device 104*a* may have a fewer or greater number of subcomponents. For example, in some implementations, the user endpoint device may have controllers, drivers, repeaters, receivers, and/or other subcomponents to facilitate or provide other computer-based functionalities or services. Further, the interfaces may include address, control, and/or data connections to facilitate communication among the illustrated components.

In some implementations, the server 102 may be structurally similar to (and may include one or more or all of the same subcomponents as) the user endpoint device 102*a*. In one implementation, for example, the server 102, like endpoint device 104*a*, may have a CPU, computer memory/storage, and a network interface. In some implementations, the server 208 also may include an I/O device interface with one or more I/O devices attached thereto.

In a typical implementation, the server 102 is a cloud-based server (e.g., as provided with Amazon Web Services (AWS)) and may be configured to provide cloud-based computing services. AWS provides on-demand delivery of IT resources over the Internet including technology services such as computing power, storage, and databases on an as-needed basis through a cloud-based architecture.

Figure 3:
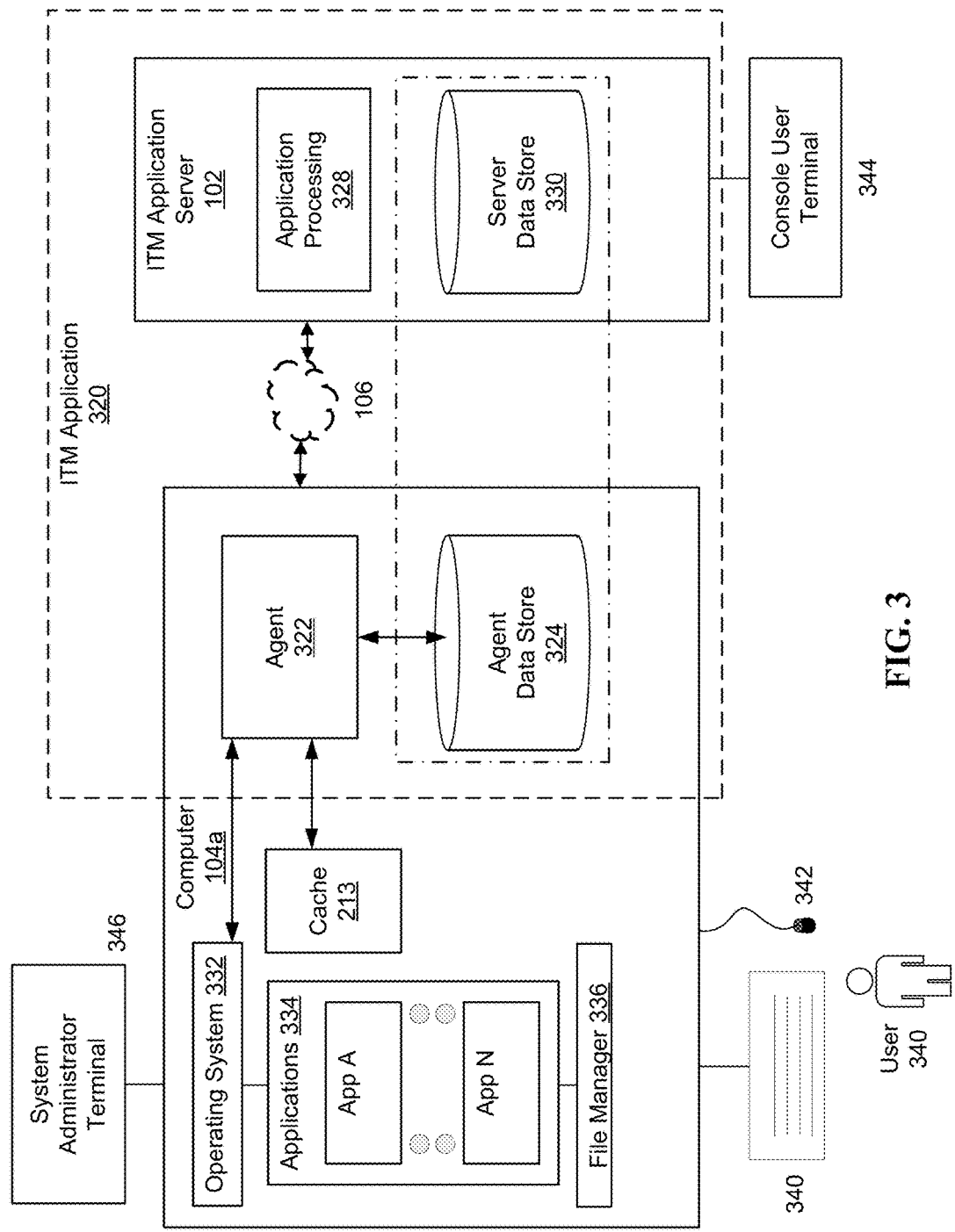
FIG. 3 is a partial schematic representation of an exemplary ITM application distributed across a portion of the network from FIG. 1.

FIG. 3 is a partial schematic representation of network 100 showing an example of an insider threat management (ITM) system, configured to incorporate the data transmission reduction techniques disclosed herein, deployed on the network 100.

The ITM system in the illustrated example is implemented as an ITM application deployed as software on the network 100 and implemented by, and in conjunction with, computer hardware including processor(s), etc. performing functionalities according to the ITM application software.

The ITM application 320 in the illustrated implementation is distributed across a portion of the network 100 that includes user endpoint device 104a (which, in the illustrated implementation, is a computer and the remotely-located insider threat management (ITM) application server 102. The endpoint device 104a is coupled to the ITM application server 102 via communications network 106.

The ITM application 320 includes and utilizes several components including, an agent 322 and an agent data store 324 that reside at the endpoint device 104a, ITM application processing components 328, and an ITM application server data store 330 at the ITM application server 102. The agent 322, in a typical implementation, is implemented by software loaded into computer-based memory (e.g., 210) and executed by a processor (e.g., CPU 208) in the endpoint device 104a. The agent data store 324 may be implemented, for example, by a portion of computer-based memory (e.g., 210 or 212) in the endpoint device 104a. The application processing components 328 may be implemented by software loaded into computer-based memory and executed by a processor at the ITM application server 102. The server data store 330 may be implemented, for example, by a portion of memory at the ITM application server 102.

In addition to hosting a portion of the distributed ITM application 320, the endpoint device 104a in the illustrated implementation has an operating system 332, a plurality of software applications 334 (app A A . . . app N), and a file manager 336. In a typical implementation, each of these components may be implemented via software loaded into computer-based memory and executed by a processor at the endpoint device 104a.

In a typical implementation, the operating system 322 is provided by software that manages operation of hardware and software at the endpoint device 104a and that provides common services for computer programs. Examples of operating systems include the Microsoft Windows® operating system, the macOS operating system by Apple, Inc., and variations of the Linux operating system. In a typical implementation, each application 334 is provided by software for a program designed for an end-user 340 at the computer. Applications 334 can include, for example, software programs for word processing, spreadsheets, accounting, web browsers, email applications, media players, file viewers, simulators, console games, photo editors, etc. In a typical implementation, the file manager 336 is provided by software that manages and organizes files within the endpoint device 104a. Some of the more common operations that may be performed by a file manager on a file or a group of files includes creating, opening (e.g., viewing, playing, etc.) renaming, copying, moving, deleting, and searching, as well as modifying file attributes, properties, and permissions. In a typical implementation, the agent may include a sessions monitor provided by software that manages aspects of user sessions at the endpoint device 104a. The phrase user session generally refers to a lasting connection between a user and some hardware or software component (e.g., a server), usually involving the exchange of many packets between the user's computer (e.g., endpoint device 104a) and the server (e.g., ITM application server 102 or some other server).

The operating system 332 in the illustrated implementation is coupled to the applications 334, and the file manager 336 and able to receive information about user activities at the endpoint device 104a, for example, from each. The operating system 332 in the illustrated implementation is also coupled, and able to communicate with, the agent 322. In an exemplary implementation, the agent 322 can establish the coupling with the operating system 332 by registering to receive notifications from the operating system 332 when user activities (e.g., clicks of the mouse 342, clicks on the keyboard 344, etc.) are detected by the operating system 332. Subsequently, whenever a user activity happens at the endpoint device 104a, the operating system 332 is able to provide a notification, with underlying data associated therewith, to the agent 322. The underlying data can include, for example, the various pieces of data/metadata associated with the user activity and disclosed herein and can also include one or more screenshots associated with the user activity. This data/metadata can originate at the operating system 332 itself, from one or more of the applications 334, from the file manager 336, and/or from one or more other data sources within the user endpoint device 104a.

The agent 322 is generally able to assess the data it receives (e.g., from the operating system 332) about the user activity to determine, for example, whether the user's context has changed relative to a time associated with an earlier set of user activity data (e.g., the last set of user activity data collected by the agent). If the agent 322 determines that user context has changed (e.g., from the user context associated with the immediately prior user activity), then the agent 322 is configured to cause the latest set of collected data and the immediately previous set of collected data to be transmitted, over communications network 106, from the endpoint device 104a to the ITM application server 102. Otherwise, if the agent 322 determines that user context has not changed since the last set of user activity data was collected, then the agent 322 is configured to discard from cache the last set of user activity data collected by the agent and replace it with the new, or latest, set of user activity data collected by the agent.

When data is transmitted to the ITM application server 102, that data may be processed to determine whether the data indicates or suggests that the associated user activities pose a potential insider threat or not. There are a variety of ways in which this processing might happen at the ITM application server 102. For example, in some implementations, the processing that occurs at the ITM application server 102 in this regard is similar, or substantially identical, to the processing that Proofpoint's ObserveIT ITM software solution currently performs (e.g., at a corresponding server) to assess insider threat risk. In some implementations, the processing that takes place at the ITM application server 102 in this regard could be similar to the processing disclosed in the current applicant's US Patent Application Publication No. 2020-0193019 (entitled Managing Data Exfiltration Risk), which is incorporated by reference herein in its entirety. If the processing at the ITM application server 102 reveals a potential insider threat, then the ITM application 320 may produce an alert that a network security administrator, for example, may be able to access (e.g., from the console user terminal 344).

The illustrated network 100 also has a terminal 346 for a system administrator. In general, the system administrator is a human who controls and configures the operating system 332 of the endpoint device 104a. To be clear, user 340 is also a human who interacts with the computer 104a (e.g., using the applications 334, etc.), and the console user is also a human who controls and interacts with the ITM application 320. Of course, there may be a plurality of users 340, system administrators, and/or console users, and in some circumstances a system administrator and the console user may be the same individual.

Figure 4:
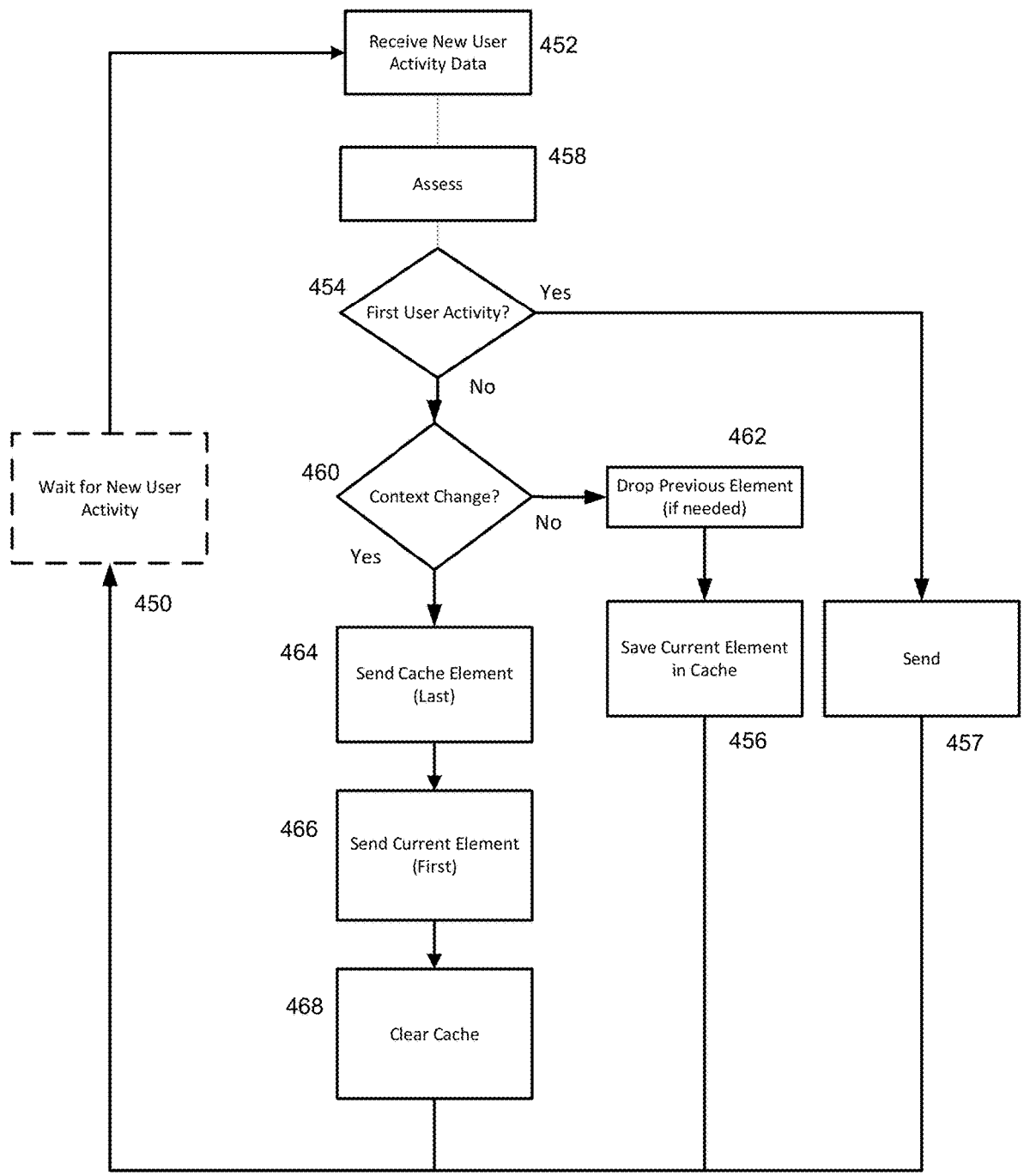
FIG. 4 is a flowchart of an exemplary process that may be performed by a computer-based agent deployed at an endpoint device on a network to manage/reduce data traffic on the network.

FIG. 4 is a flowchart of an exemplary process that may be performed by the agent 322 deployed at endpoint device 104*a* on network 100 to reduce data transmitted across network 106.

The illustrated process begins with the agent 322 (at 450) waiting for a user activity (e.g., a mouse-click or the press of a keyboard button, etc.) to occur at the endpoint device 104*a*.

When a use activity happens, the agent 322 (at 452) receives a communication (e.g., from the operating system 332) that indicates to the agent 322 that a user activity has occurred at the associated endpoint device 104*a*. This communication may include, for example, a variety of data (e.g., metadata about the user activity and one or more screenshots from the endpoint device 104*a* where the user activity occurred at (or near) when the user activity occurred). The various different types of data that might be provided in this regard are disclosed herein elsewhere.

The agent 322 (at 458) assess the new user activity data.

If the agent 322 determines (454) that the new user activity is the first user activity to have occurred at the associated endpoint device 104*a* in the current monitoring session (e.g., since the agent 322 initiated the latest monitoring for new user activities at the endpoint device 104*a* or immediately following the clearing of cache 213), then the agent 322 (at 457) sends the user activity data for that user activity to the ITM application server 102. In a typical implementation, that set of user activity data also may be stored in memory (e.g., in the agent data store 324), but it is not generally stored in cache, because it already has been transmitted to the ITM application server 102.

Then, the agent 322, according to the illustrated process, returns to 450 to wait for the operating system 332 to send another new user activity notification that a new user activity has occurred at the endpoint device 104*a*.

There are a variety of ways in which the agent 322 may determine (at 454) whether a particular user activity is the first new activity to have occurred at the endpoint device 104*a* in the current monitoring session. For example, in some implementations, the agent 322 may check to see if any data is stored already in cache 213. If the agent 322 determines that there is no data stored already in cache 213, then the agent may conclude that the new user activity just received represents the first new user activity to have occurred at the endpoint device 104*a* in the current monitoring session. If the agent 322 determines that there is data stored already in cache 213, then the agent 322 may conclude that the new user activity just received does not represent the first new user activity to have occurred at the endpoint device 104*a* in the current monitoring session. In some implementations, the agent 322 may maintain a counter that gets refreshed with every new monitoring session and gets incremented when a new user activity notification is received. In those instances, the agent 322 can determine whether a particular notification relates to a first user activity based on a value in the counter. There are a variety of other ways in which the agent 322 may be able to determine that a particular notification relates to a first user activity or not.

If the agent 322 concludes (at 454) that the new user activity data does not represent a first user activity in the current monitoring session, then the agent 322 assesses whether the new user activity data indicates a change in user context at the user endpoint device 104*a*. There are a variety of ways in which the agent 322 may perform this assessment. In a typical implementation, the assessment involves performing a comparison based on the current user activity data set (i.e., a recent user activity) and the immediately prior user activity data set, which may at that point have already been stored in the agent data store 324 or in cache 213. Unless otherwise indicated, the phrases new user activity, current user activity, recent user activity, and the like may be used interchangeably herein. In general, each of these phrases refers to the most recent user activity at the computer that is being processed (e.g., by the agent at the computer).

Figure 7:
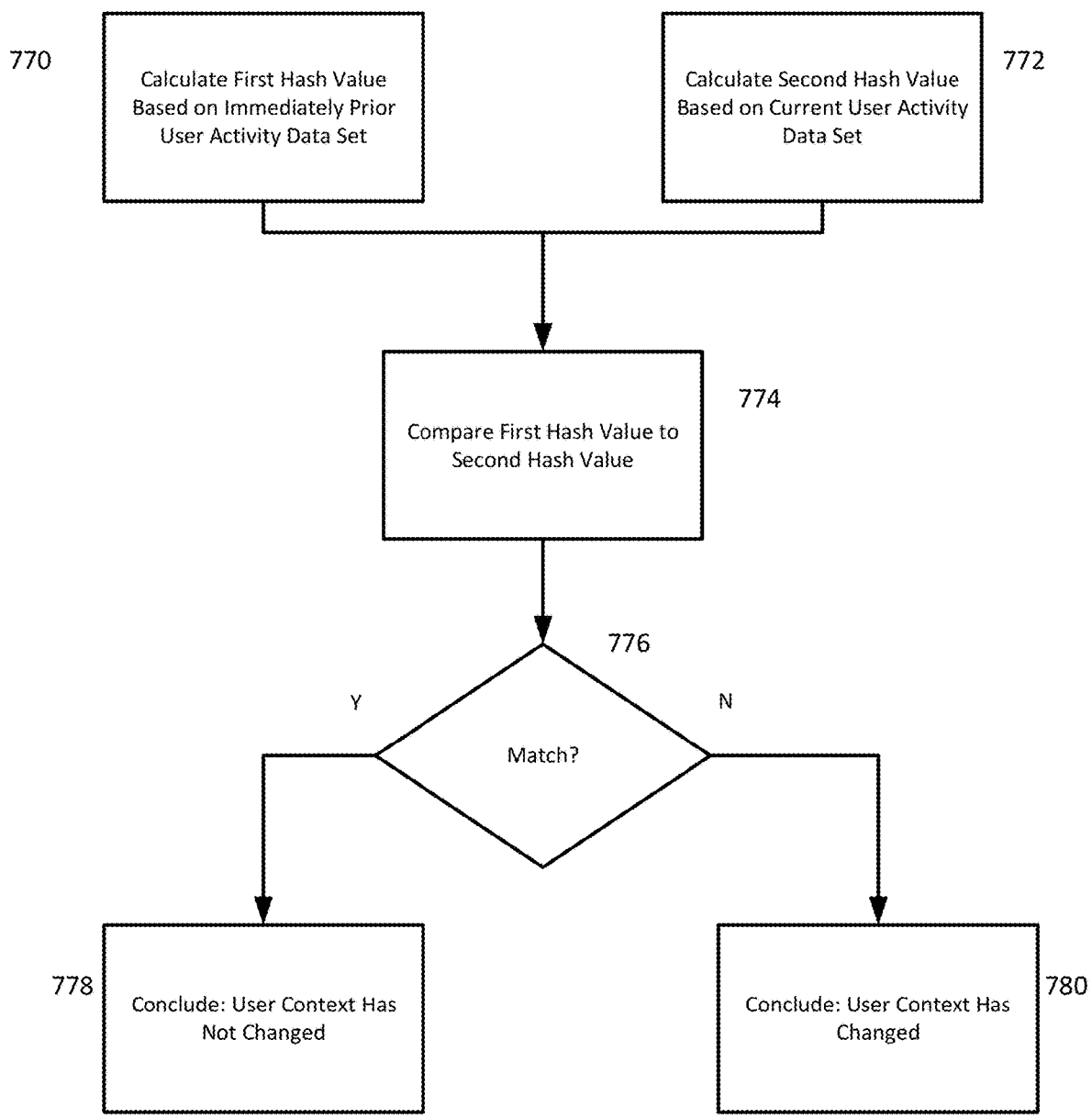
FIG. 7 is a flowchart of an exemplary process for assessing whether user context has changed from one user activity to the next.

FIG. 7 is a flowchart representing one exemplary process for determining whether or not a new set of user activity data represents a change in user context at the user endpoint device 104*a*.

According to the illustrated process, the agent 322 calculates a first hash value (at 770) based on the immediately prior user activity data set and calculates a second hash value (at 772) based on the current user activity data set. In general, a hash function takes a group of characters and maps it to a value of a certain length (called a hash value or hash). The hash value is representative of the original string of characters but is smaller than the original. In the illustrated process, the group of characters for each hash may include a collection of data from the associated user activity data set that may be relevant to user context at the user endpoint device 104*a* at the time of the associated user activity. In a typical implementation, the data used to calculate each hash value may include any one or more of the following: data representing a category of the user activity, a URL domain, an application name, a window title, a window/tab identifier, and/or any combination thereof. In one particular example, the data used to calculate each hash includes a URL domain, an application name, a window title, a window/tab identifier, as applicable to each associated user activity, respectively.

In a typical implementation, the hash function used to calculate the first hash value at 770 and will be the same as the hash function used to calculate the second hash value at 772. That said, virtually any kind of hash function can be utilized to calculate the first and second hash values (at 770 and 772). Preferably, the hash function will: 1) be very fast to compute; and 2) minimize the possibility of duplication of output values (collisions) when the inputs are different. One such example may be one of the secure hash algorithms (SHAs). More specifically, in one exemplary implementation, the system may utilize a native operating system hash function. For example, the following code may be utilized in a MAC environment:

return [[NS String stringWithFormat:@"%@:%@:%@:%@:%@:%@", processName, _processID, appName, windowID, wintitle, docname] hash];

(docname can be a document in editor or URL in browser for example)

In a typical implementation, the set of available inputs for calculating the first hash value at 770 is the same as the set of available inputs for calculating the second hash value at 772 and the hash function for calculating the first hash value at 770 is the same as the hash function for calculating the second hash value at 772. That way, if the inputs for calculating the first hash value (which come from the immediately prior user activity data set) are identical to the inputs for calculating the second hash value (which come from the current user activity data set), then the first hash value will match the second hash value. Otherwise, if the inputs for calculating the first hash value (which come from the immediately prior user activity data set) are not identical to the inputs for calculating the second hash value (which come from the current user activity data set), then the first hash value will not match the second hash value.

Referring again to the flowchart of FIG. 7, after calculating the first and second hash values (at 770 and 772), the agent 322 then (at 774) compares the first hash value to the second hash value. If the agent 322 determines (at 776) that the first hash value matches the second hash value, then the agent 322 concludes (at 778) that the user context did not change from the immediately prior user activity to the current user activity. However, if the agent determines (at 776) that the first hash value does not match the second hash value, then the agent 322 concludes (at 780) that the user context did change from the immediately prior user activity to the current user activity.

In an exemplary implementation, a process=Finder, a pid=338, an app=Finder, a window_id=378, a windowTitle="Copy To USB", and a document="MyDocument." In this example, the hash function code may look like this:

NSUInteger myhash=[[NS String stringWithFormat:@"finder:338:finder:378:copy to usb:my document"] hash];

And the output hash number on a MAC may appear like this:

hash value is 5048528973137975627.

Referring again to the flowchart in FIG. 4, if the agent 322 (at 460) determines that there has been no change in user context between the last user activity and the current user activity, then the agent (at 462) deletes any data that was being stored in cache 213 and (at 456) replaces the deleted data with the new user activity data set. Then the agent 322 returns to 450 to wait for the operating system 332 to send a notification of a next new user activity at the endpoint device 104a.

If the agent 322 (at 460) determines that there has been a change in user context between the immediately prior user activity and the current user activity, then the agent (at 464) causes the user activity data that was stored in cache 213 (i.e., the user activity data for the immediately prior user activity, just before user context changed) to be transmitted to the ITM application server 102, and also (at 466) causes the new user activity data (i.e., the user activity data for the current user activity, immediately after user context changed) to be transmitted to the ITM application server 102. The transmittals are performed by the network interface 214 over communications network 106. In this example, the data that was stored in cache already would have represented the immediately prior data set, which would have been captured just before the user context changed at the endpoint device 104a. Moreover, the new user activity data—just received from the operating system 332—would have represented the first data set captured just after the user context changed at the endpoint device 104a.

After the user activity data is transmitted to the ITM application server 102 (at 464 and 466), cache is cleared (at 468). In a typical implementation, the user activity data for the last user activity is saved in the endpoint device 104a (e.g., in the agent data store 324). Then, the process returns to 450 where the agent 322 waits for the operating system 332 to send a notification that a subsequent new user activity has occurred at the endpoint device 104a.

Figure 5:
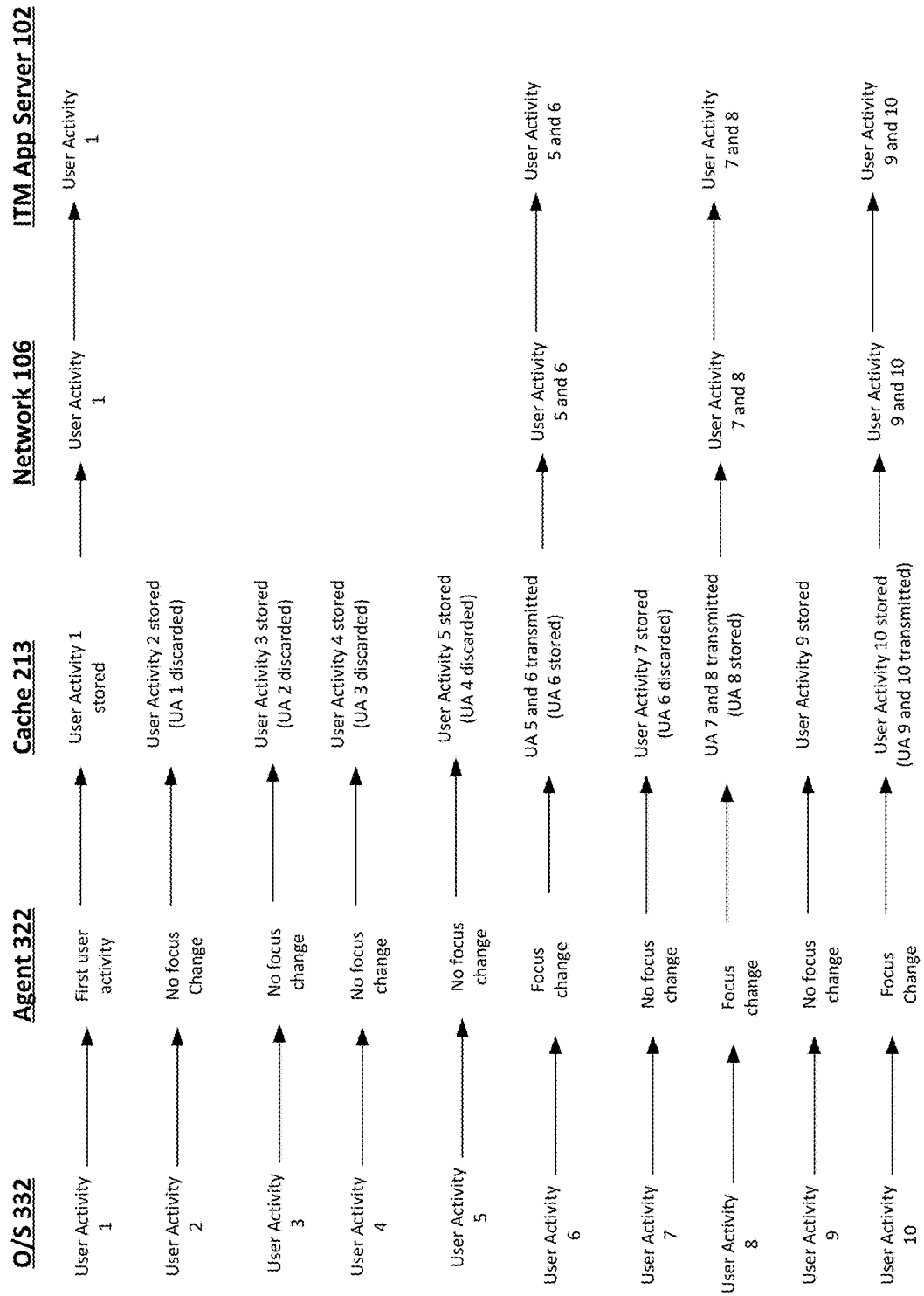
FIG. 5 is a data flow diagram showing one example of how a particular sequence of user activity data sets might flow between, and be handled among, various components in the network of FIG. 1 when an agent implements the process outlined in FIG. 4.

FIG. 5 is a data flow diagram showing one example of how a particular sequence of user activity data sets might flow between various components in network 100 when implementing the process outlined in FIG. 4. More specifically, the illustrated flow diagram shows how the sequence of user activity data sets might flow between the operating system 332, agent 322, cache 213, communications network 106 (e.g., via transceivers at either end), and the ITM application server 102 in network 100 during the FIG. 4 process.

According to the illustrated data flow diagram, in response to a first user activity (user activity 1) at computer 104a, the operating system 332 provides a first set of user activity data for user activity 1 to the agent 322. As an example, this first set of user activity data might include the following:

User Activity 1
Time Stamp (e.g., from IDT): Jun. 26, 2020, 8:27:03 AM
Activity Category: Web Browsing, Application Use
User: nirbarak
Endpoint Hostname: nirs-mbp
Activity Summary:
URL Domain: app.oitroot.us-east-1-stage2 . . .
Window Title: Proofpoint Insider Threat Co . . .

The agent 322 (at 454 in FIG. 4) determines that this is the first user activity in the current monitoring session and, therefore, sends (457) the data set for user activity 1, via network 106, to the ITM application server 102.

Next, according to the illustrated example, in response to a second user activity (user activity 2) at computer 104a, the operating system 332 provides a second set of user activity data for user activity 2 to the agent 322. As an example, this second set of user activity data might include the following:

User Activity 2
Time Stamp (e.g., from IDT): Jun. 26, 2020, 8:27:10 AM
Activity Category: Web Browsing, Application Use
User: nirbarak
Endpoint Hostname: nirs-mbp
Activity Summary:
URL Domain: app.oitroot.us-east-1-stage2 . . .
Window Title: Proofpoint Insider Threat Co . . .

The agent 322 (at 458 in FIG. 4) assesses this second user activity and determines (since all of the data, except for the time stamp, matches all of the corresponding data from the prior user activity data set, which is now stored in memory) that there has been no change in the user's context (at 460). Then, the data set for user activity 2 is saved in cache (456). Note that user activity 1 never went into the cache since it was first event and was already sent. At that point, nothing is transmitted to the ITM application server 102.

Next, according to the illustrated example, in response to a third user activity (user activity 3) at computer 104a, the operating system 332 provides a third set of user activity data for user activity 3 to the agent 322. As an example, this third set of user activity data might include the following:

User Activity 3
Time Stamp (e.g., from IDT): Jun. 26, 2020, 8:27:15 AM
Activity Category: Web Browsing, Application Use
User: nirbarak
Endpoint Hostname: nirs-mbp
Activity Summary:
URL Domain: app.oitroot.us-east-1-stage2 . . .
Window Title: Proofpoint Insider Threat Co . . .

The agent 322 (at 458 in FIG. 4) assesses this third user activity and determines (since all of the data, except for the time stamp, matches all of the corresponding data from the prior user activity data set, which is now stored in cache) that there has been no change in the user's context (at 460). Then, the data set for user activity 3 is saved in cache (456), replacing the data set for user activity 2, which is discarded (462). At that point, nothing is transmitted to the ITM application server 102.

Next, according to the illustrated example, in response to a fourth user activity (user activity 4) at computer 104*a*, the operating system 332 provides a fourth set of user activity data for user activity 4 to the agent 322. As an example, this fourth set of user activity data might include the following:
User Activity 4
Time Stamp (e.g., from IDT): Jun. 26, 2020, 8:27:17 AM
Activity Category: Web Browsing, Application Use
User: nirbarak
Endpoint Hostname: nirs-mbp
Activity Summary:
URL Domain: app.oitroot.us-east-1-stage2 . . .
Window Title: Proofpoint Insider Threat Co . . .

The agent 322 (at 458 in FIG. 4) assesses this fourth user activity and determines (since all of the data, except for the time stamp, matches all of the corresponding data from the prior user activity data set, which is now stored in cache) that there has been no change in the user's context (at 460). Then, the data set for user activity 4 is saved in cache (456), replacing the data set for user activity 3, which is discarded (462). At that point, nothing is transmitted to the ITM application server 102.

Next, according to the illustrated example, in response to a fifth user activity (user activity 5) at computer 104*a*, the operating system 332 provides a fifth set of user activity data for user activity 5 to the agent 322. As an example, this fifth set of user activity data might include the following:
User Activity 5
Time Stamp (e.g., from IDT): Jun. 26, 2020, 8:27:19 AM
Activity Category: Web Browsing, Application Use
User: nirbarak
Endpoint Hostname: nirs-mbp
Activity Summary:
URL Domain: app.oitroot.us-east-1-stage2 . . .
Window Title: Proofpoint Insider Threat Co . . .

The agent 322 (at 458 in FIG. 4) assesses this fifth user activity and determines (since all of the data, except for the time stamp, matches all of the corresponding data from the prior user activity data set, which is now stored in cache) that there has been no change in the user's context (at 460). Then, the data set for user activity 5 is saved in cache (456), replacing the data set for user activity 4, which is discarded (462). At that point, nothing is transmitted to the ITM application server 102.

Next, according to the illustrated example, in response to a sixth user activity (user activity 6) at computer 104*a*, the operating system 332 provides a sixth set of user activity data for user activity 6 to the agent 322. As an example, this sixth set of user activity data might include the following:
User Activity 6
Time Stamp (e.g., from IDT): Jun. 26, 2020, 8:27:23 AM
Activity Category: Application Use
User: nirbarak
Endpoint Hostname: nirs-mbp
Activity Summary:
Application Name: Microsoft Word
Window Title: Document 1

The agent 322 (at 458 in FIG. 4) assesses this sixth user activity and determines (since there is a difference in the sixth set of user activity data as compared to the corresponding data from the prior user activity data set, which is now stored in memory at the endpoint device) that there has been a change in the user's context (at 460). The differences include: 1) that the user's context changed from Activity Category: Web Browsing, Application Use to Activity Category: Application Use, 2) that the user's context changed from URL Domain: app.oitroot.us-east-1-stage2 . . . to Application Name: Microsoft Word, and/or 2) that the user's context changed from Window Title: Proofpoint Insider Threat Co . . . to Window Title: Document 1. Thus, the hash values calculated by the agent (at 770, 772) would differ.

Since the agent 322 determines (at 460) that there has been a change in user context, the agent 322 causes the cached fifth user activity data set to be transmitted from cache 213, via network 106, to the ITM application server 102 (at 464) as a snapshot representing the time before the user's context changed. The agent 322 also causes the current (or sixth) user activity data set to be transmitted via network 106 to the ITM application server 102 (at 466). This sixth user activity data set represents a snapshot of the time immediately following the user's change in context. After the sixth user activity data set is transmitted to the ITM application server 102, cache is cleared (at 468). At that point, the sixth user activity data set may be stored in the endpoint device (e.g., in the agent datastore 324).

Next, according to the illustrated example, in response to a seventh user activity (user activity 7) at computer 104*a*, the operating system 332 provides a seventh set of user activity data for user activity 7 to the agent 322. As an example, this seventh set of user activity data might include the following:
User Activity 7
Time Stamp (e.g., from IDT): Jun. 26, 2020, 8:27:28 AM
Activity Category: Application Use
User: nirbarak
Endpoint Hostname: nirs-mbp
Activity Summary:
Application Name: Microsoft Word
Window Title: Document 1

The agent 322 (at 458 in FIG. 4) assesses this seventh user activity and determines (since all of the data, except for the time stamp, matches all of the corresponding data from the prior user activity data set, which is now stored in cache) that there has been no change in the user's context (at 460). Then, the data set for user activity 7 is saved in cache (456). Note that user activity 6 was not in cache since it was sent before, and cache was cleared. At that point, nothing is transmitted to the ITM application server 102.

Next, according to the illustrated example, in response to an eighth user activity (user activity 8) at computer 104*a*, the operating system 332 provides an eighth set of user activity data for user activity 8 to the agent 322. As an example, this eighth set of user activity data might include the following:
User Activity 8
Time Stamp (e.g., from IDT): Jun. 26, 2020, 8:27:31 AM
Activity Category: Application Use
User: nirbarak
Endpoint Hostname: nirs-mbp
Activity Summary:
Application Name: Slack
Window Title: Slack|Unread Messages|0 . . .

The agent 322 (at 458 in FIG. 4) assesses this eighth user activity and determines (since there is a difference in the eighth set of user activity data as compared to the corresponding data from the prior user activity data set, which is now stored in memory in the endpoint device) that there has been a change in the user's context (at 460). Although the activity category is the same in both data sets (application use), the differences include: 1) that the user's context changed from Application Name: Microsoft Word to Application Name: Slack, and/or 2) that the user's context changed from Window Title: Document 1 to Window Title: Slack|Unread Messages|0 . . . Thus, the hash values calculated by the agent (at 770 and 772) would differ.

Since the agent 322 determines (at 460) that there has been a change in user context, the agent 322 causes the cached seventh user activity data set to be transmitted from cache 213, via network 106, to the ITM application server 102 (at 464), as a snapshot representing the time immediately before the user's context changed. The agent 322 also causes the current (or eighth) user activity data set to be transmitted via network 106 to the ITM application server 102 (at 466). This eighth user activity data set represents a snapshot of the time immediately following the user's change in context. After the eighth user activity data set is transmitted to the ITM application server 102, cache is cleared (at 468). At that point, the eighth user activity data set may be stored in the endpoint device (e.g., in the agent datastore 324).

Next, according to the illustrated example, in response to a ninth user activity (user activity 9) at computer 104a, the operating system 332 provides a ninth set of user activity data for user activity 9 to the agent 322. As an example, this ninth set of user activity data might include the following:
User Activity 9
Time Stamp (e.g., from IDT): Jun. 26, 2020, 8:27:33 AM
Activity Category: Application Use
User: nirbarak
Endpoint Hostname: nirs-mbp
Activity Summary:
Application Name: Slack
Window Title: Slack|Unread Messages 10 . . .

The agent 322 (at 458 in FIG. 4) assesses this ninth user activity and determines (since all of the data, except for the time stamp, matches all of the corresponding data from the prior user activity data set, which is now stored in cache) that there has been no change in the user's context (at 460). Then, the data set for user activity 9 is saved in cache (456). Note that there was no need to put user activity data 8 in cache. At that point, nothing is transmitted to the ITM application server 102.

Finally, in the illustrated example, in response to a tenth user activity (user activity 10) at computer 104a, the operating system 332 provides a tenth set of user activity data for user activity 10 to the agent 322. As an example, this tenth set of user activity data might include the following:
User Activity 10
Time Stamp (e.g., from IDT): Jun. 26, 2020, 8:27:35 AM
Activity Category: Application Use
User: nirbarak
Endpoint Hostname: nirs-mbp
Activity Summary:
Application Name: Microsoft Word
Window Title: Document 1

The agent 322 (at 458 in FIG. 4) assesses this tenth user activity and determines (since there is a difference in the tenth set of user activity data as compared to the corresponding data from the prior user activity data set, which is now stored in memory of the endpoint device 104a) that there has been a change in the user's context (at 460). The differences include: 1) that the user's context changed from Application Name: Slack to Application Name: Microsoft Word, and/or 2) that the user's context changed from Window Title: Slack|Unread Messages|0 . . . to Window Title: Document 1. Thus, the hash values calculated by the agent (at 770 and 772) would differ.

Since the agent 322 determines (at 460) that there has been a change in user context, the agent 322 causes the cached ninth user activity data set to be transmitted from cache 213, via network 106, to the ITM application server 102 (at 464) as a snapshot representing the time before the user's context changed. The agent 322 also causes the current (or tenth) user activity data set to be transmitted via network 106 to the ITM application server 102 (at 466). This tenth user activity data set represents a snapshot of the time immediately following the user's change in context. After the tenth user activity data set is transmitted to the ITM application server 102, cache is cleared (at 468). At that point, the tenth user activity data set may be stored in the endpoint device (e.g., in the agent datastore 324).

An overview of the data flow diagram in FIG. 5 reveals that the data reduction techniques disclosed herein significantly reduce the number of data transmissions that otherwise might have occurred (e.g., if every set of user activity data collected were transferred).

Figure 6:
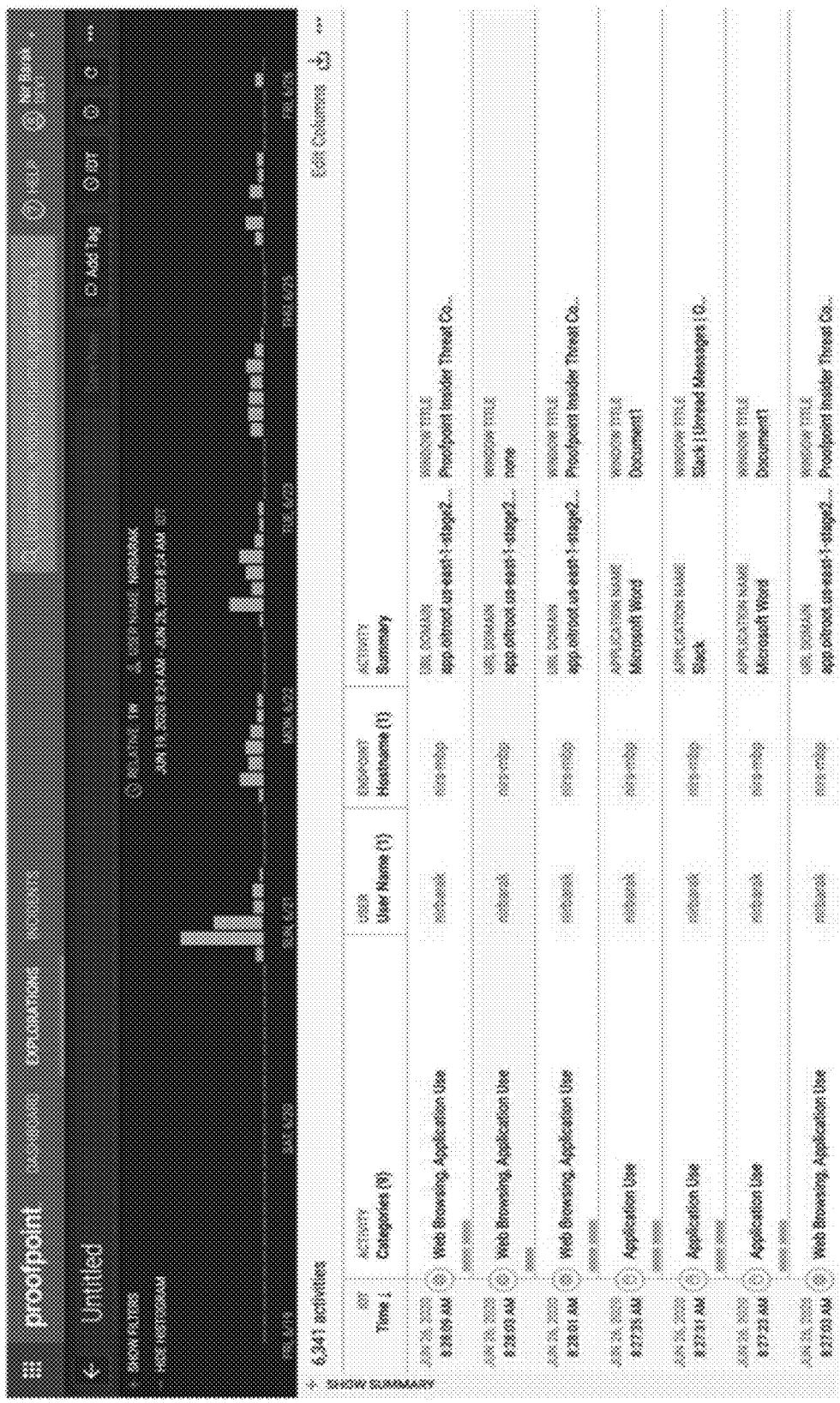
FIG. 6 is a screenshot showing an example of a user interface (e.g., at a system administrator terminal) for an implementation of an ITM solution deployed on the network of FIG. 1 that includes the data reduction/management approaches described herein.

FIG. 6 is a screenshot showing an example of a user interface at a system administrator terminal (e.g., 346 in FIG. 3) for an implementation of an ITM solution deployed on a network (e.g., 100 in FIG. 3) that includes the data reduction/management approaches described herein. The illustrated screenshot includes a listing of user activity data that has been transmitted to an ITM application server by an agent deployed at a network endpoint device. The listed user activities are for a particular user (having user-name "nirbarak") over a particular period of time (i.e., a 24-hour period of time "Jun. 19, 2020 8:24 AM-Jun. 26, 2020 8:24 AM)."

The listing identifies some of the various data types that a solution of this type might collect, analyze, and report on. These include, for each user activity: a time and date of the activity, a category for the activity, a user-name for the user that performed the activity, a hostname for the host of the activity, and activity summary information including a URL domain or application name for the activity, and a window title for the activity. Each of these data types is represented in one of the columns in the listing of reported user activity data.

Beneath each activity category listing, is one bar or two bars. The data entries that have two bars indicate that the associated data includes two user activity data sets—a first at the beginning of the associated user context time period and a second at the end of the associated user context time period. The data entry (on Jun. 26, 2020 at 8:28:03 AM) that has only one bar indicates that the associated data includes only one user activity data set. This would typically happen if, for example, a user's context changed and then changed again without any user activities happening between the two. Thus, each line represents an activity inside a group. Two lines means the group has first and last (which happens when the user does several clicks in the same context). One line means there was just one activity (i.e., a first but without last), which happens when the user, for example, clicks on a new application and then the next click is in a new context. Since moving context clears the cache, the next click, which, again, is a new context finds nothing in the cache, so the agent sends just one activity only.

The upper portion of the illustrated screenshot, above the listing of user activity data has a bar chart that represents the number of user activities reported (e.g., from the agent 322 to ITM application server 102 in FIG. 3) over the course of a period of several days (e.g., from Sunday, June 21-Friday, June 26). The height of each bar represents the relative quantity of user activity data that was reported from the agent to the ITM server during each corresponding period of time. In the illustrated example, the data reduction/management techniques disclosed herein were not operational during the first day of the indicated period (on Sunday 6/21) but became operational later (Sunday at noon). It can be seen from the progression of bars in the illustrated bar graph that the amount of data transmitted from the agent to the ITM server dropped considerably from the morning of Sunday 6/21 (before the data reduction/management techniques were applied) to the afternoon of Sunday 6/21 and beyond (after the data reduction/management techniques were applied).

A number of embodiments of the invention have been described. Nevertheless, it will be understood that various modifications may be made without departing from the spirit and scope of the invention.

For example, the techniques disclosed herein are described within the context of an insider threat management (ITM) solution. However, the data transmission reduction techniques have broader implications than ITM. In various implementations, they may be deployed in connection with any one of a variety of different applications where large amounts of data are collected at certain devices (e.g., endpoint devices on a computer network) and transmitted elsewhere for processing, etc. (e.g., to a server). These may be systems or applications that collect data and where user context can change. The systems or applications may not be related to insider threat detection but may be directed toward understanding user behavior for other reasons (e.g., archiving, etc.).

In various implementations, the agent may be particularly tailored to communicate with a specific operating system resident on the computer. For example, the agent may be specifically tailored to communicate with Windows OS, MacOS, or Unix/Linux, among others. Some implementations may include a single ITM application server, the ITM application server in some implementations may be distributed across two or more physical server devices. Likewise, the server data store may be distributed across two or more physical server devices.

As noted previously, users are humans who interacts with the computer/network, the system administrator is also a human who controls and configures the operating system of the computer, and the console user is also a human who controls and interacts with the ITM application. Of course, in various implementations, there may be a plurality of users, system administrators, and/or console users, and in some circumstances a system administrator and the console user may be the same individual.

In some embodiments (e.g., where there is more than one ITM application server), they may be load balanced with either a software or hardware-based device (not shown). In that case the agents may communicate with the load balancer's virtual IP (VIP). The ITM application server may analyze and compress received data, then store the data, for example by splitting textual data in an SQL Server database, and graphic images on a file share, where the SQL server database and the file share are stored in the server data store. The console user may connect, via a web-based interface to the ITM application, for example using a web browser, and search for, replay, run reports and inspect alerts based on the transmitted user activity. Any component of the data transfer or data storage process can be encrypted, if desired.

Typically, multiple endpoint devices (e.g., for one company) would be connected to one ITM application server (or a plurality of ITM application servers cooperating to provide services associated with one single instance of the ITM application).

In some implementations, instead of comparing hash values to determine whether there has been a change in user context, the agent may compare individual data items from the current user activity data set and the immediately prior user activity data set. Several different types of data may be relevant to the user's context at the endpoint device 102a in this regard. For example, in some instances, the URL domain or application name associated with a user activity may be relevant to the user's context at the time of the activity. In those instances, if the prior user activity data indicated that the earlier user activity was associated with a particular URL domain (e.g., "app.oitroot.us-east-1-stage2 . . . ") and the latest user activity data indicated that the latest user activity was not associated with that URL domain, but instead was associated with a particular application name (e.g., Microsoft Word), then the agent 322 (at 460) would conclude that the user's context changed from the prior user activity to the latest user activity. More particularly, in this example, the user's context would have changed from the URL domain of "app.oitroot.us-east-1-stage2 . . . " to the application named Microsoft Word. As another example, in some instances, the window title or window/tab id associated with a user activity may be relevant to the user's context at the time of the activity. In those instances, if the prior user activity data indicated that the prior user activity was associated with (e.g., performed within) a window having a first title (e.g., "Proofpoint Insider Threat Co . . . ") and the latest user activity data indicated that the latest user activity was associated with (e.g., performed within) a different window having a second title (e.g., "Document 1") different than the first, then the agent 322 (at 460) would conclude that the user's context changed from the prior user activity to the latest user activity. More particularly, in this example, the user's context would have changed from the window entitled "Proofpoint Insider Threat Co . . . " to the window entitled "Document 1." In some instances, the agent 322 (at 458) might considers several different types of data (including, for example, activity category, URL domains, application names, window titles, and/or window/tab id, etc.) to determine whether the user changed context or not between the latest user activity and the user activity immediately prior to the latest user activity. In various implementations, other types of data may be relevant to the user's context at the endpoint device 104a as well and may be used in this regard. Typically, in those instances, if the agent 322 determines (at 458/460) that any one of those data types has changed from one user activity data set to the next user activity data set, then the agent 322 (at 460) will conclude that there has been a change in user context. Otherwise, if, and only if, none of the data types considered by the agent 322 in this regard has changed from the earlier user activity data set to the next user activity data set, then the agent 322 (at 466) will conclude there has been no change in the user's context. In a typical implementation, if the agent 322 concludes, at any point, that there has been a change in any particular piece of relevant data between two subsequent user activity data sets, then the agent may conclude that there has been a change in user context without necessarily comparing and of the other types of data in the two data sets. So, for example, if the agent 322 concludes (at 458/460) that there has been a change in application name from one user activity data set to the next user activity data set, then the agent 322 may conclude that there has been a change in user context without necessarily having to compare other types of data (e.g., window titles, etc.) in the two data sets.

In a typical implementation, the techniques disclosed herein involve the endpoint agent using smart heuristics to decide how to reduce the data being transmitted with minimal loss of ability to detect "bad" activities (e.g., potential insider threat risks) by the backend. The techniques typically can achieve significant reduction without significant loss of information important to analyze behavior.

The agent, in certain implementations, essentially detects similarities between a sequence of activities based on identifying information about the activities. In some implementations, the list can be configurable (e.g., by a system administrator or the like) and may include various identifying information about the activity—this information may include user, application, and user interface attributes. In some implementations, the ITM application may be configured to present a user interface to the system administrator, for example, that enables the system administrator to select or specify the attributes to be utilized by the agent in this regard. The agent then treats a sequence of similar activities as a group and only sends a few (e.g., first and last) representative activities for that sequence.

For example, as described herein, based on specific attributes the agent can detect a sequence of interactions of a user in the same application without any significant changes by tracking the attributes of an interaction (application name, user, user interface parameters such as a window title and position). In this case the agent may only send the first and the last activity within this sequence. In the last activity the agent can encapsulate a lot of the data about the interaction that occurred within the whole sequence, which will further reduce the loss of information important for "bad" activity detection by the backend. If the activity is writing mail, for example, the last activity before the window closes is usually the full mail message that the user was writing, or if the activity occurs within an editor, for example, the last activity before the user closes the editor will usually be the full document, or at least how it appeared before the user decides to add later on more to it (which again should end with a new last). This will result in an activity log at the server, for example, that includes the first activity (when the interaction started) and the last activity (when the interaction ended) and that also contain a summary of the interaction that occurred in between (represented by only select data associated with that period). When applied to screenshots the first picture will show the beginning of an interaction (opening/focusing a window), while the last will show the end result of work in the window.

In some implementations, the systems and techniques disclosed herein may be further enhanced to include other types of "important" activity within a sequence of similar activities (for example when the user or an application performs a significant operation (e.g., a file open, or a pressing of "enter" on a command terminal window).

In some implementations, the ITM application may provide a system administrator, for example, with the option to override the functionalities disclosed herein under certain circumstances. So, generally, the ITM application server receives and processes only the first and last user activity data sets for each particular sequence of user activities having a common user context. If that functionality is overridden, then the ITM application server may receive and process more than only the first and last user activity data sets from a particular segment in which the user's context was continuous if certain criteria (e.g., certain very sensitive data is accessed, etc.) is met. Under some of those circumstances, the ITM application server may receive and process an individual user activity data set for every user activity that happens during a particular sequence of user activities having a common context.

Moreover, in certain implementations, there may be certain user activities that would under all circumstances warrant sending more than only the first and last user activity data sets having a common context. These might include user activities, such as File Move or File Copy, which are more likely than most moves to warrant sending all of the collected user activity data sets over a particular segment of time near that user activity. In some implementations, the ITM application may store (e.g., in the agent data store of the endpoint device) a list of these sorts of user activities. Moreover, when the agent receives a user activity data set (e.g., from the operating system of the endpoint device), the agent may check the user activity data set against the list of user activities that warrant departure from the data reduction techniques disclosed herein.

It should be understood that the example embodiments described herein may be implemented in many different ways. In some instances, the various methods and machines described herein may each be implemented by a physical, virtual, or hybrid general purpose computer, such as the computer system, or the computer network environment described herein. The computer system may be transformed into the machines that execute the methods described herein, for example, by loading software instructions into either memory or non-volatile storage for execution by the CPU. One of ordinary skill in the art should further understand that the system and its various components may be configured to carry out any embodiments or combination of embodiments of the present invention described herein. Further, the system may implement the various embodiments described herein utilizing any combination of hardware, software, and firmware modules operatively coupled, internally, or externally, to or incorporated into the system. Further, the system may be communicatively coupled to or be embedded within a manufacturing device and be configured so as to control the device to create a physical object as described herein.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification (e.g., those represented in FIG. 4, and otherwise disclosed herein) can be implemented as operations performed by a data processing apparatus (e.g., a processor/specially-programmed processor) on data stored on one or more computer-readable storage devices or received from other sources, such as the computer system and/or network environment in FIGS. 1-3. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other implementations are within the scope of the claims.

What is claimed is:

1. A computer-based method of reducing data transmissions from a computer to a remote network destination, the computer-based method comprising:
    receiving an indication, at an agent on the computer, that a recent user activity has occurred at the computer, wherein the indication comprises data relevant to user's context when the user activity occurred, wherein the data relevant to the user's context when the user activity occurred comprises an identification of one, and only one, visual element on a display screen of the computer that was in-focus during the recent user activity or that became in-focus as a result of the recent user activity, wherein the in-focus visual element is one that has been selected by a human user;
    determining, with the agent, whether the data relevant to the user's context when the recent user activity occurred indicates that the visual element that was in-focus during the recent user activity or that became in-focus as a result of the recent user activity is different than an in-focus visual element associated with an immediately prior user activity, indicating a change in user context relative to the user activity at the computer immediately prior to the recent user activity;
    transmitting data relevant to the recent user activity from the computer to the remote network destination or not transmitting the data relevant to the recent user activity from the computer to the remote network destination depending on an outcome of the determination;
    transmitting the data relevant to the recent user activity, from the computer to the remote network destination, in response to the agent determining that the visual element that was in-focus during the recent user activity or that became in-focus as a result of the recent user activity is different than an in-focus visual element associated with an immediately prior user activity, but not transmitting the data relevant to the recent user activity, from the computer to the remote network destination, if the agent determines that the visual element that was in-focus during the recent user activity or that became in-focus as a result of the recent user activity is not different than an in-focus visual element associated with an immediately prior user activity;
    storing, in cache, the data relevant to user context during the immediately prior user activity;
    replacing the data stored in cache with the data relevant to the recent user activity in response to the agent determining that there was not a change in user context; and
    transmitting the data in cache and the data relevant to the recent user activity, from the computer to the remote network destination, in response to the agent determining that there was a change in user context,
    wherein determining whether there has been a change in user context comprises:
        calculating a first hash value based on data relevant to user context during the user activity immediately prior to the recent user activity; and
        calculating a second hash value based on the data relevant to user context during the recent user activity;
        comparing the first hash value to the second hash value, and
        concluding, based on the comparison, whether user context has changed, wherein the first hash value and the second hash value are calculated using the same hash function, and wherein available inputs for the first hash function are identical to available inputs for the second hash function.

2. The computer-based method of claim 1, further comprising:
    transmitting, from the computer to the remote network destination, the data relevant to the recent user activity and data relevant to the user activity immediately prior to the recent user activity when the agent determines that user context at the computer has changed.

3. The computer-based method of claim 2, further comprising:
    not transmitting, from the computer to the remote network destination, any data relevant to any user activities that occur between a first and last user activity during a particular user context.

4. The computer-based method of claim 1, wherein the data relevant to user context comprises one or more of an activity category, a URL domain, an application name, a window title, a window/tab identifier, and/or any combination thereof.

5. The computer-based method of claim 1, wherein the agent receives the indication of the user activity at the computer from an operating system of the computer, with the data relevant to user context originating from any one of the operating system of the computer, an application running on the computer, and/or a file manager on the computer.

6. The computer-based method of claim 1, further comprising:
processing any transmitted data at the remote network destination.

7. A computer system configured to limit data transmissions from a computer to a server, the computer system comprising:
a computer comprising a processor and memory;
a server;
a communications network that enables the server and the computer to communicate with one another; and
an agent on the computer, wherein the agent is configured by virtue of the processor executing computer-readable instructions stored in the memory, to:
receive an indication that a recent user activity has occurred at the computer, wherein the indication comprises data relevant to user's context when the user activity occurred, wherein the data relevant to the user's context when the user activity occurred comprises an identification of one, and only one, visual element on a display screen of the computer that was in-focus during the recent user activity or that came into focus as a result of the recent user activity, wherein the in-focus visual element was the visual element on the display screen that had been selected at the time of the recent user activity or that became selected as a result of the recent user activity, such that text entered at a keyboard of the computer or pasted from the computer's clipboard would have been sent to the in-focus visual element;
determine whether the data relevant to the user's context when the user activity occurred indicates that the visual element that was in-focus during the recent user activity or that became in-focus as a result of the recent user activity was different than an in-focus visual element associated with an immediately prior user activity, indicating a change in user context relative to the user activity at the computer immediately prior to the recent user activity;
transmit data relevant to the recent user activity from the computer to the server via the communications network or not transmitting the data relevant to the recent user activity depending on an outcome of the determination;
transmit the data relevant to the recent user activity, from the computer to the remote network destination, in response to the agent determining that the visual element that was in-focus during the recent user activity or that became in-focus as a result of the recent user activity is different than an in-focus visual element associated with an immediately prior user activity, but not transmitting the data relevant to the recent user activity, from the computer to the remote network destination, if the agent determines that the visual element that was in-focus during the recent user activity or that became in-focus as a result of the recent user activity is not different than an in-focus visual element associated with an immediately prior user activity;
store, in cache, the data relevant to user context during the immediately prior user activity;
replace the data stored in cache with the data relevant to the recent user activity in response to the agent determining that there was not a change in user context; and
transmit the data in cache and the data relevant to the recent user activity, from the computer to the remote network destination, in response to the agent determining that there was a change in user context,
wherein determining whether there has been a change in user context comprises:
calculating a first hash value based on data relevant to user context during the user activity immediately prior to the recent user activity; and
calculating a second hash value based on the data relevant to user context during the recent user activity; and
comparing the first hash value to the second hash value,
concluding, based on the comparison, whether user context has changed, wherein the first hash value and the second hash value are calculated using the same hash function, and wherein available inputs for the first hash function are identical to available inputs for the second hash function.

8. The computer system of claim 7, wherein the computer is configured to transmit to the server:
the data relevant to the recent user activity and data relevant to the user activity immediately prior to the recent user activity when the agent determines that user context at the computer has changed.

9. The computer system of claim 8, wherein the computer is configured to not transmit to the server:
data relevant to any user activities that occur between a first and last user activity during a particular user context.

10. The computer system of claim 7, wherein the data relevant to user context comprises one or more of an activity category, a URL domain, an application name, a window title, a window/tab identifier, and/or any combination thereof.

11. The computer system of claim 7, wherein the computer further comprises an operating system, a plurality of software applications, a file manager, and a sessions manager, and wherein the agent receives the indication of the user activity at the computer from the operating system, and wherein the data relevant to user context originating from any one of the operating system of the computer, one of the applications running on the computer, and/or the file manager.

12. The computer system of claim 7, wherein the server is configured to process any transmitted data.

13. A non-transitory computer-readable medium storing computer-readable instructions that, when executed by a processor of a computer, cause the processor limit transmissions to a server by:
receiving an indication that a recent user activity has occurred at the computer, wherein the indication comprises data relevant to user's context when the user activity occurred, wherein the data relevant to the user's context when the user activity occurred comprises an identification of one, and only one, visual element on a display screen of the computer that was in-focus during the recent user activity or that became in-focus as a result of the recent user activity, wherein the in-focus visual element is the visual element on the display screen that had been selected at the time of the recent user activity or that became selected as a result of the recent user activity, such that text entered at a keyboard of the computer or pasted from the computer's clipboard would have been sent to the in-focus visual element;

determining whether the data relevant to the user's context when the user activity occurred indicates that the visual element that was in-focus during the recent user activity or that became in-focus as a result of the recent user activity was different than an in-focus visual element associated with an immediately prior user activity, indicating a change in user context relative to the user activity at the computer immediately prior to the recent user activity;

transmitting data relevant to the recent user activity from the computer to the remote network destination or not transmitting the data relevant to the recent user activity from the computer to the remote network destination depending on an outcome of the determination;

transmitting the data relevant to the recent user activity, from the computer to the remote network destination, in response to the agent determining that the visual element that was in-focus during the recent user activity or that became in-focus as a result of the recent user activity is different than an in-focus visual element associated with an immediately prior user activity, but not transmitting the data relevant to the recent user activity, from the computer to the remote network destination, if the agent determines that the visual element that was in-focus during the recent user activity or that became in-focus as a result of the recent user activity is not different than an in-focus visual element associated with an immediately prior user activity;

storing, in cache, the data relevant to user context during the immediately prior user activity;

replacing the data stored in cache with the data relevant to the recent user activity in response to the agent determining that there was not a change in user context; and transmitting the data in cache and the data relevant to the recent user activity, from the computer to the remote network destination, in response to the agent determining that there was a change in user context, wherein determining whether there has been a change in user context comprises:

calculating a first hash value based on data relevant to user context during the user activity immediately prior to the recent user activity; and calculating a second hash value based on the data relevant to user context during the recent user activity;

comparing the first hash value to the second hash value, and concluding, based on the comparison, whether user context has changed, wherein the first hash value and the second hash value are calculated using the same hash function, and wherein available inputs for the first hash function are identical to available inputs for the second hash function.

14. The computer-based method of claim 1, wherein the in-focus visual element is one that has been selected by a human user such that any text entered at a keyboard of the computer or pasted from the computer's clipboard would be sent to the in-focus visual element.

15. A computer-based method of regulating data transmissions in a computer-based Insider Threat Monitoring (ITM) system from an agent deployed on an endpoint device of a computer network to a remote server for data processing across the computer network, the computer-based method comprising:

receiving a first indication, at the agent on the endpoint device, that a first user activity caused by a human user has occurred at the endpoint device, wherein the first indication of the first user activity comprises a first set of user activity data that identifies one, and only one, visual element on a display screen of the endpoint device that was in-focus during the first user activity or that became in-focus in response to the first user activity, wherein the in-focus visual element is the visual element on the display screen that had been selected at the time of the recent user activity or that became selected as a result of the recent user activity, such that text entered at a keyboard of the computer or pasted from the computer's clipboard would have been sent to the in-focus visual element;

receiving a second indication, at the agent on the endpoint device, that a second user activity has occurred at the endpoint device, wherein the second indication of the second user activity comprises a second set of user activity data that identifies which visual element on the display screen of the endpoint device was in-focus during the second user activity or that became in-focus in response to the second user activity;

calculating a first hash value at the agent by applying a first hash function to the first set of user activity data associated with the first user activity;

calculating a second hash value at the agent by applying the first hash function to the second set of user activity data associated with the second user activity;

comparing at the agent the first hash value to the second hash value;

determining at the agent whether the visual element on the display screen of the endpoint device that was in-focus during the second user activity or that became in-focus in response to the second user activity matches the visual element on the display screen of the endpoint device that was in-focus during the first user activity or that became in-focus in response to the first user activity, based on the comparison;

transmitting data in the second set of user activity data from the endpoint device to the remote server in response to the agent determining, based on the comparison, that the visual element on the display screen of the endpoint device that was in-focus at the time of the second user activity or that became in-focus in response to the second user activity did not match the visual element on the display screen of the endpoint device that was in-focus at the time of the first activity or that became in-focus in response to the first user activity, but not transmitting the data from the second set of user activity data from the endpoint device to the remote server in response to the agent determining, based on the comparison, that the that the visual element on the graphical user interface of the endpoint device that was selected at the time of or by the second user activity matches the visual element on the graphical user interface of the endpoint device that was selected at the time of or by the first user activity.

16. A computer-based method of regulating data transmissions in a computer-based Insider Threat Monitoring (ITM) system from an agent deployed on an endpoint device of a computer network to a remote server for data processing across the computer network, the computer-based method comprising:

receiving a first indication, at the agent on the endpoint device, that a first user activity caused by a human user has occurred at the endpoint device, wherein the first indication of the first user activity comprises a first set of user activity data that identifies which one, and only one, visual element on a display screen of the endpoint device was in focus during or came into focus in response to the first user activity;

saving the first set of user activity data in a cache;

receiving a second indication, at the agent on the endpoint device, that a second user activity has occurred at the endpoint device, wherein the second indication of the second user activity comprises a second set of user activity data that identifies which visual element on the display screen of the endpoint device was in focus during or came into focus in response to the second user activity;

calculating a first hash value at the agent by applying a first hash function to the first set of user activity data associated with the first user activity;

calculating a second hash value at the agent by applying the first hash function to the second set of user activity data associated with the second user activity;

comparing at the agent the first hash value to the second hash value;

determining at the agent whether the visual element on the display screen of the endpoint device that was in focus during or came into focus in response to the second user activity matches the visual element on the display screen of the endpoint device that was selected during or became selected by the first user activity based on the comparison, wherein:
if the agent determines, based on the comparison, that the visual element on the display screen of the endpoint device that was in focus during or came into focus in response to the second user activity matches the visual element on the display screen of the endpoint device that was selected during or became selected by the first user activity then:
deleting the first set of user activity data from the cache;
storing the second set of user activity data in the cache, and
not transmitting the first set of user activity data or the second set of user activity data to the remote server; and
if the agent determines, based on the comparison, that the visual element on the display screen of the endpoint device that was in focus during or came into focus in response to the second user activity did not match the visual element on the display screen of the endpoint device that was selected during or became selected by the first user activity then:
transmitting the first set of user activity data from the cache to the remote server; and
transmitting the second set of user activity data to the remote server.

17. A computer-based method of regulating data transmissions in a computer-based Insider Threat Monitoring (ITM) system from an agent deployed on an endpoint device of a computer network to a remote server for data processing across the computer network, the computer-based method comprising:

receiving a first indication, at the agent on the endpoint device, that a first user activity caused by a human user has occurred at the endpoint device, wherein the first indication of the first user activity comprises a first set of user activity data that identifies which one, and only one, visual element on a display screen of the endpoint device was in focus during the first user activity or came into focus in response to the first user activity;

determining at the agent whether any of other user activities occurred during a current monitoring session prior to the first user activity;

transmitting the first set of user activity data from the endpoint device to the remote server in response to the agent determining that no other user activities have occurred during the current monitoring session prior to the first user activity;

receiving a second indication, at the agent on the endpoint device, that a second user activity has occurred at the endpoint device, wherein the second indication of the second user activity comprises a second set of user activity data that identifies which visual element on the display screen of the endpoint device was in focus during the second user activity or came into focus in response to the second user activity;

determining at the agent whether any of other user activities occurred during the current monitoring session prior to the second user activity;

saving the second set of user activity data in a cache in response to the agent determining that another user activity has occurred during the current monitoring session prior to the second user activity;

receiving a third indication, at the agent on the endpoint device, that a third user activity has occurred at the endpoint device, wherein the third indication of the third user activity comprises a third set of user activity data that identifies which visual element on the display screen of the endpoint device was in focus during the third user activity or came into focus in response to the third user activity;

calculating a first hash value at the agent by applying a first hash function to the second set of user activity data associated with the second user activity;

calculating a second hash value at the agent by applying the first hash function to the third set of user activity data associated with the third user activity;

comparing at the agent the first hash value to the second hash value;

determining at the agent, based on the comparison, whether the visual element on the display screen of the endpoint device that was in focus during the third user activity or came into focus in response to the third user activity matches the visual element on the display screen of the endpoint device that was in focus during the second user activity or came into focus in response to the second user activity;

wherein:
if the agent determines, based on the comparison, that the visual element on the display screen of the endpoint device that was in focus during the third user activity or came into focus in response to the third user activity matched the visual element on the display screen of the endpoint device that was in focus during the second user activity or came into focus during the second user activity then:

deleting the second set of user activity data from the cache;

storing the third set of user activity data in the cache, and not transmitting the second set of user activity data or the third set of user activity data to the remote server; and if the agent determines, based on the comparison, that the visual element on the display screen of the endpoint device that was in focus during the third user activity or came into focus in response to the third user activity did not match the visual element on the display screen of the endpoint device that was in focus during the second user activity or came into focus in response to the second user activity then:

transmitting the second set of user activity data from the cache to the remote server;

transmitting the third set of user activity data to the remote server; and clearing the cache.

\* \* \* \* \*